United States Patent [19]

Henne et al.

[11] Patent Number: 5,322,246
[45] Date of Patent: Jun. 21, 1994

[54] ICE PREVENTION DEVICE FOR AIRFOILS

[75] Inventors: Preston A. Henne, Irvine; Walter S. Boronow, Cerritos; Samuel L. Wong, Laguna Hills; Willard D. Himebaugh, Westminster, all of Calif.

[73] Assignee: McDonnell Douglas Corporation, Long Beach, Calif.

[21] Appl. No.: 743,667

[22] Filed: Aug. 12, 1991

[51] Int. Cl.⁵ .............................................. B64D 15/00
[52] U.S. Cl. .................................. 244/134 E; 244/200; 244/204
[58] Field of Search ............... 244/134 E, 134 R, 200, 244/204, 198, 134 A, 199

[56] References Cited

U.S. PATENT DOCUMENTS

| | | | |
|---|---|---|---|
| 1,831,780 | 11/1931 | Sharp | 244/198 |
| 2,555,625 | 6/1951 | Antonson | 244/134 R |
| 2,585,285 | 2/1952 | Tonge et al. | 244/134 R |
| 2,800,291 | 7/1957 | Stephens | 244/200 |
| 3,013,752 | 12/1961 | Rush | 244/134 R |
| 3,519,229 | 7/1970 | Son Gullberg | 244/134 R |
| 4,606,519 | 8/1986 | Fertis et al. | 244/200 |
| 4,732,351 | 3/1988 | Bird | 244/134 R |
| 4,750,693 | 6/1988 | Löbert et al. | 244/200 |
| 4,899,284 | 2/1990 | Lewis et al. | 244/219 |
| 4,899,772 | 2/1990 | Rao | 137/1 |
| 5,133,519 | 7/1992 | Falco | 244/200 |

FOREIGN PATENT DOCUMENTS

| | | | |
|---|---|---|---|
| 104114 | 2/1917 | United Kingdom | 244/200 |
| 192568 | 2/1923 | United Kingdom | 244/200 |

Primary Examiner—Michael S. Huppert
Assistant Examiner—Anne E. Bidwell
Attorney, Agent, or Firm—James M. Skorich; John P. Scholl

[57] ABSTRACT

An aft facing step situated across the span of an airfoil. A chemical or thermal deicing or running wet anti-icing device is located in or on the airfoil upstream of the step, and causes water to run back towards the step. The step suddenly reduces the thickness of the airfoil chord section, which causes a disturbance in the boundary layer across the span of the airfoil downstream of the step. The aforementioned disturbance causes runback water to form droplets and be blown clear of the airfoil surface downstream of the step, thereby preventing ice from being formed on the airfoil surface downstream of the step.

8 Claims, 3 Drawing Sheets

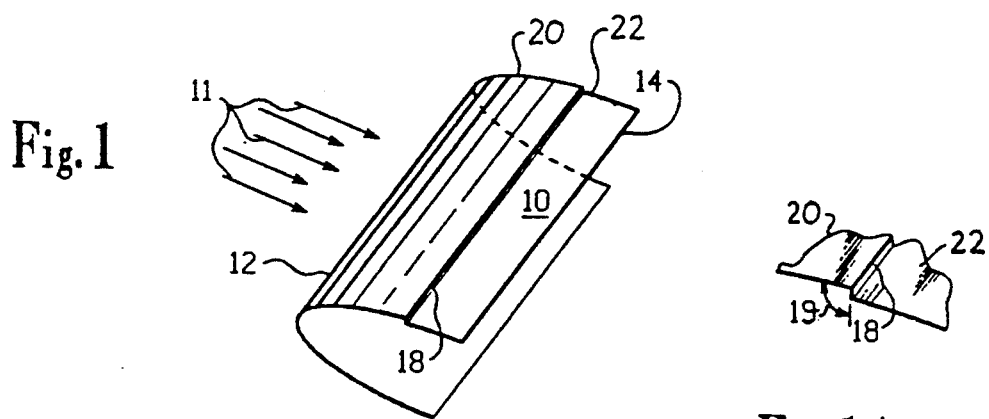
Fig. 1
Fig. 1A
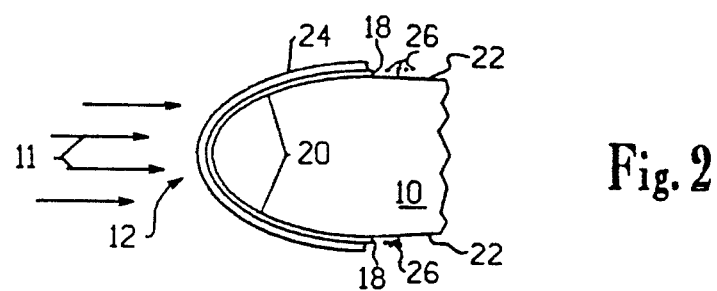
Fig. 2
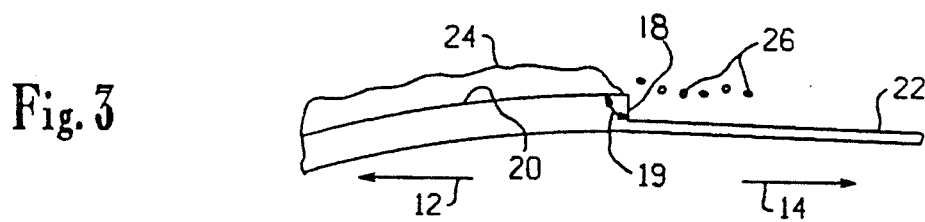
Fig. 3
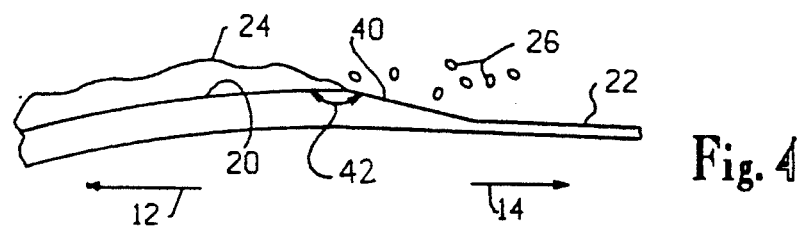
Fig. 4

ICE PREVENTION DEVICE FOR AIRFOILS

TECHNICAL FIELD

This invention relates to the field of deicing and anti-icing devices used on airplanes. More particularly, this invention is a device for preventing the formation of ice on the surface of an airfoil aft of its leading edge.

BACKGROUND OF THE INVENTION

When an airplane is flown during certain atmospheric conditions, ice can accumulate on its exterior surfaces. The formation of this ice can be precipitated either by impingement of atmospheric supercooled water droplets or by leakage of water from internal systems. The formation of ice gives rise to four areas of concern. Firstly, exterior surface ice can break loose and cause damage to engines, protruding surfaces such as antennas, wings and moveable control surfaces, and structures on the ground, as well as result in injury to people on the ground. Secondly, ice accumulations on airfoil sections such as wings and stabilizers can seriously degrade the airfoil's aerodynamic performance by adversely affecting both its lift and drag characteristics.

Thirdly, the weight of ice changes the overall weight of the airplane and also its center of gravity. Finally, water can run back, or downstream, from the leading edge where it impinges or is formed when ice is melted by deicing means, and subsequently freeze on moveable surfaces and interfere with their operation. Consequently, the airplane industry has focused a great deal of attention on the development of devices to either prevent the formation of ice on airplane surfaces or to remove the ice from such surfaces.

Ice protection apparatus are generally categorized as either deicing or anti-icing. Deicing devices allow ice to form and periodically remove it. Anti-icing apparatus prevent the formation of ice on the airplane surfaces. The three general approaches to deicing are thermal, chemical and mechanical.

Thermal deicing raises the temperature of the airfoil surface by heating. One thermal deicing apparatus is a heating element either contained in an elastomeric boot located on a leading edge to be deiced or integrally incorporated into the leading edge. The heating element is powered by electrical energy from a generating source usually driven by the aircraft engine. The leading edge is heated by the heating element until some of the ice melts and the remaining ice is dislodged and swept away by the airstream.

Another thermal deicing approach involves the circulation of gases at elevated temperatures through passageways in the leading edge of an airfoil. The hot gases are supplied by the compressor stages of a turbine engine, resulting in reduced fuel economy and lower turbine power output. Another drawback inherent to all thermal deicing devices is the formation of water from melted ice, called runback water, which runs back and refreezes to form runback ice on downstream surfaces. Runback ice may cause unwanted and unpredictable aerodynamic forces, added weight, interference with the operation of movable surfaces, and damage if a mass of runback ice breaks loose.

Chemical deicing, also known as freezing point depression, is achieved by application of a chemical to the ice through pores in the leading edge. The freezing point of the ice is lowered and it turns to slush, which is swept away by the airstream. The application of the chemical must be repeated as ice reforms and thus the store of chemical must be replenished after each icing flight. Further adding to the maintenance burden is the ongoing requirement to check the application apparatus to ensure its proper operation. Another drawback is the formation of runback water from melted ice, which can form runback ice downstream of the leading edge.

Mechanical deicing devices deform the exterior surface of the airplane to break up the ice and allow it to be swept away by the airstream. Pneumatic boots are the original and most popular device in this class. The boots are expandable tube-like structures typically used to cover the leading edge of an airfoil. The structures are inflated with pressurized fluids and cause the ice to crack. However, the distortion occasioned in an airstream profile by inflation of the tube-like structures can substantially alter the airstream pattern over the airfoil and adversely affect the airfoil's lift characteristics. All of the various mechanical deicing devices remove the ice without melting it, thereby avoiding the creation of runback water and, concomitantly, runback ice.

Two anti-icing approaches are used to protect airplanes from the formation of ice on their external surfaces: evaporative and running wet. Evaporative anti-icing systems completely evaporate all impinging water by heating the leading edge or other area of water impingement to a high temperature. This solution eliminates the problem of runback water and ice, but requires using excessive thermal energy and is costly. Running wet systems melt all of the ice forming in the area where the water is impinging by the use of freezing point depressants or thermal energy provided by heating means, but do not evaporate the resulting water, instead allowing it to run downstream. Although less costly to operate than evaporative anti-icing systems, running wet systems have an inherent drawback in that the runback water flows back over unheated or untreated surfaces of the airfoil to possible form runback ice.

Several techniques are used to avoid the formation of runback water and ice attendant to the use of running wet anti-icing systems. Heating the entire surface from the leading edge to the trailing edge to keep the surface temperature above the freezing temperature will prevent refreezing of the runback water, but requires a very high expenditure of thermal energy and also increases the mechanical complexity of the underlying structure. Using excessive freezing point depressant in the area of impingement tends to prevent refreezing of runback water, but the chemicals inevitably wear off and evaporate, and thus the foregoing solution cannot ensure that runback water will not subsequently begin freezing without intermittent reapplications of the depressant. The process thus requires constant monitoring by the crew of the airplane, and is always limited by the finite reservoir of depressant that can be carried.

SUMMARY OF THE INVENTION

The present invention is an apparatus which prevents the formation of ice on the aft section of an airfoil. It would typically be employed in conjunction with a running wet anti-icing apparatus or a thermal or chemical deicing apparatus because each of the foregoing ice protection devices produce runback water. The invention is an aft facing step that runs spanwise along substantially the entire span of the airfoil. The thermal heater or pores used to communicate the freezing point depressant cover the area upstream of the step or, at a minimum, the leading edge.

With respect to a running wet anti-icing device, sufficient heat or freezing point depressant is applied to keep all impinging liquid droplets in the liquid state upstream of the step. With respect to a thermal or chemical deicing apparatus, sufficient heat or freezing point depressant is applied to melt the formed ice. In either case, the step causes the runback water to be broken into droplets and blown clear of the downstream airfoil surface by the airflow, so that no heat or freezing point depressant need be applied downstream of it. Refreezing of the runback water is virtually eliminated.

The step can be located to avoid critical aerodynamic regions that would be unpredictably affected by it. The configuration of the step is designed to minimize any adverse aerodynamic effects. The height of the step is kept to a minimum consistent with the ability to shed water. The commonly observed effects of an aft facing step on aerodynamic performance, e.g., increased drag and loss of lift, are minimized by design of the step geometry and placement. In fact, in some instances the aerodynamic performance of the airfoil may be enhanced by the presence of the step.

In a manner identical to its use to remove runback water caused by an anti-icing or deicing device, the invention can also be used to remove runback water from other sources as well as other types of runback liquid, for example, waste water, oil and hydraulic fluid.

By practicing the invention, the formation of runback ice that normally accompanies the use of thermal and chemical deicing and running wet anti-icing apparatus is avoided. The step can be located at any point aft of the leading edge or other area of moisture impingement, and only the area forward of the step need be protected from ice by a thermal or chemical deicing or running wet anti-icing apparatus. The present invention reduces the electrical power, thermal energy, engine bleed air or freezing point depressant required by a thermal or chemical deicing or running wet anti-icing apparatus, in proportion to the reduction of the protected area.

It is therefore an object of the present invention to provide an improvement in running wet anti-icing and chemical and thermal deicing apparatus.

Another object of the invention is to eliminate runback ice on an airfoil.

A further object of the invention is to remove runback water and other runback liquids from the surface of an airplane or airfoil.

Yet another object of the invention is to minimize the use of electrical power, thermal energy, engine bleed air, or freezing point depressant required by a running wet anti-icing or chemical or thermal deicing device.

BRIEF DESCRIPTION OF THE DRAWINGS

FIG. 1 is a perspective view of an airfoil which includes the straight step embodiment of the invention.

FIG. 1A is an enlarged fragmentary view of one area of FIG. 1, showing in detail the aft facing step and step angle depicted in FIG. 1.

FIG. 2 is a fragmentary cross section of a chord of the airfoil shown in FIG. 1.

FIG. 3 is an enlarged fragmentary view of one area of the airfoil and straight step embodiment of the invention shown in FIG. 2.

FIG. 4 is an enlarged fragmentary view of a cross section of a chord of an airfoil incorporating the ramp embodiment of the invention.

DETAILED DESCRIPTION OF THE DRAWINGS

Figure 5:
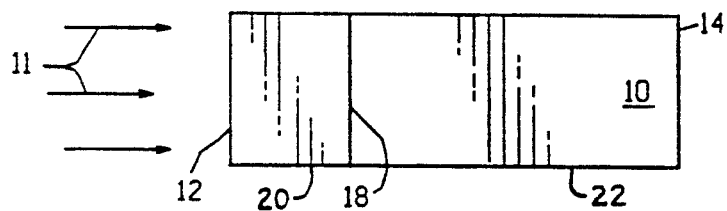
FIG. 5 is a plan view of an airfoil incorporating the straight step embodiment of the invention.

The invention is a device to protect airplanes from the formation of ice on their external surfaces, particularly on their airfoils. The invention is intended to be used in concert with a conventional thermal or chemical deicing or running wet anti-icing apparatus to remove the runback water generated by the operation of the foregoing apparatus, although it could be used alone to remove runback liquids emanating from other sources. To facilitate the subsequent description of several embodiments of the invention, the embodiments are shown and described as being deployed in conjunction with a thermal or chemical deicing device.

FIG. 1 illustrates an embodiment of the invention incorporated in airfoil 10, which may be a wing, engine inlet cowl, stabilizer, or antenna. Ambient airstream 11 flows over airfoil 10 from leading edge 12 to trailing edge 14. Incorporated into airfoil 10 is aft facing step 18. FIG. 1A shows that aft facing step 18 has step angle 19 of ninety (90) degrees with the upstream surface 20 located immediately forward of step 18. Step angle 19 is also the angle formed between step 18 and downstream surface 22 located immediately aft of step 18. Step 18 is continuous and runs in a spanwise direction across airfoil 10. For an airfoil having a sweep angle of zero degrees, such as airfoil 10, step 18 lies substantially orthogonal to the direction of ambient airstream 11 across airfoil 10 when airfoil 10 is at an angle of attack of zero degrees.

A boundary layer is created around airfoil 10 when it is moving through air, where a boundary layer is defined as the flow of a portion of a viscous fluid of retarded velocity which is in the neighborhood of a body in contact with the fluid and in motion relative to the fluid. Because of the presence of the aft facing step 18, the boundary layer is disturbed at step 18 and across downstream surface 22.

FIG. 2 shows a fragmentary cross-section of airfoil 10. An enlarged fragmentary cross-section of airfoil 10 detailing aft facing step 18 is provided by FIG. 3. Ice 24 is shown formed on upstream surface 20. A thermal or freezing point depressant deicing system of conventional design (not shown) melts ice 24 upstream of the step, and the melted water or mixture of water and freezing point depressant, also known as runback water, flows aft under the force of airstream 11. At aft facing step 18, surface tension forces cause the unstable liquid flow to form droplets 26 and, due to the disturbance of the boundary layer across downstream surface 22 triggered by step 18, water droplets 26 are blown clear of downstream surface 22 by aerodynamic forces. This prevents the formation of ice on downstream surface 22.

Step angle 19 is approximately ninety (90) degrees, with step 18 being substantially orthogonal to upstream surface 20 and downstream surface 22, and the height of the step being kept at a minimum consistent with the ability to shed water.

FIG. 4 illustrates a cross section of an aft facing step comprising another embodiment of the invention. Aft facing step 40 is a ramp having obtuse step angle 42 and connecting upstream surface 20 and downstream surface 22. Again, the height of aft facing step 40 is kept at a minimum consistent with the ability to shed water.

Figure 8:
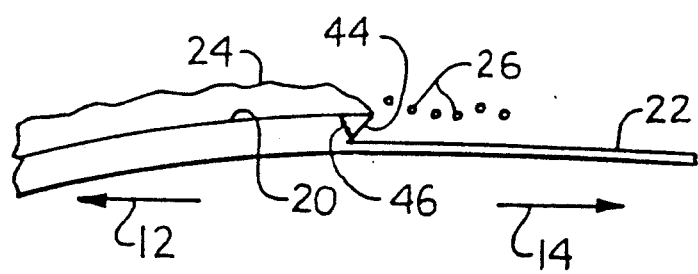
FIG. 8 is an enlarged fragmentary cross-sectional view of a chord of an airfoil incorporating the acute step embodiment of the invention.

FIG. 8 shows a cross section of an aft facing step comprising a third embodiment of the invention. Aft facing step 44, in connecting upstream surface 20 and downstream surface 22, forms acute angle 46 with upstream surface 20. The height of step 44 is kept at a minimum consistent with the ability to shed water.

FIG. 5 illustrates a plan view of straight step 18 and airfoil 10 shown in FIGS. 1, 1A, 2 and 3. Step 18 can be seen as running spanwise and substantially parallel to leading edge 12. Aft facing step 40 shown in FIG. 4 also runs substantially parallel to leading edge 12.

Figure 6:
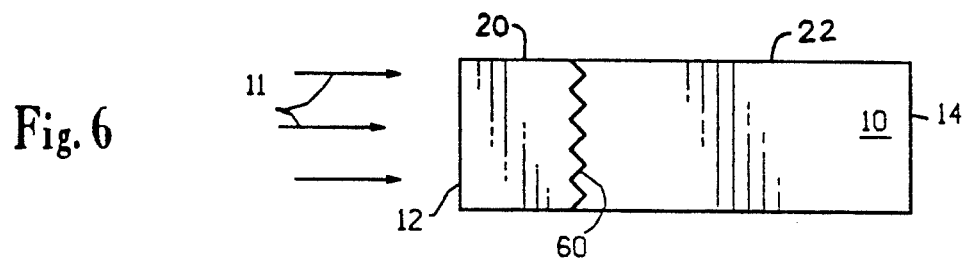
FIG. 6 is a plan view showing an airfoil having the sawtooth form of the invention.

FIG. 6 is a plan view of airfoil 10 which is equipped with aft facing step 60, another embodiment of the invention. Step 60 has a continuous, even sawtooth pattern which runs substantially parallel to leading edge 12. All of the surfaces comprising step 60 have a step angle of ninety (90) degrees.

Figure 7:
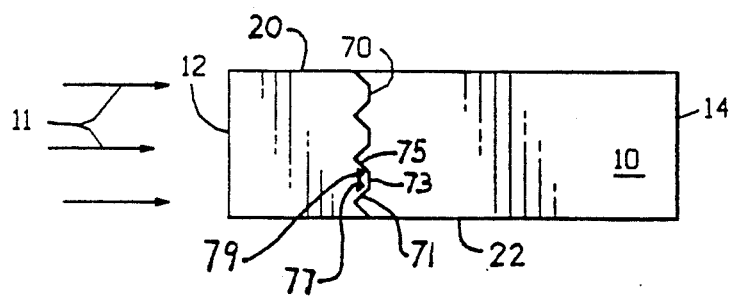
FIG. 7 is a plan view of an airfoil equipped with the truncated sawtooth form of the invention.

FIG. 7 is a plan view of airfoil 10 incorporating aft facing step 70, yet another embodiment of the invention. Here, the edge of step 70 is a continuous, evenly-spaced, truncated sawtooth pattern which runs substantially parallel to leading edge 12. Step 70 is comprised of a plurality of intersecting planar surfaces, such as surfaces 71, 73, and 75. An intersection angle is formed by the intersection of adjacent surfaces. For example, intersection angle 77 is formed by the intersection of surfaces 71 and 73, and intersection angle 79 is formed by the intersection of surfaces 73 and 75. Intersection angles 77 and 79 are greater than ninety (90) degrees. All of the surfaces comprising step 70, including surfaces 71, 73 and 75, have a step angle of ninety (90) degrees.

Changes and modifications in the specifically described embodiments can be carried out without departing from the scope of the invention, which is intended to be limited only by the scope of the appended claims.

What is claimed is:

1. An ice prevention apparatus for an airfoil comprising:
   a step on the airfoil running in a spanwise direction;
   said step causing the chordwise thickness of the airfoil to decrease;
   said step having a base where said step meets a surface of the airfoil lying downstream of said step;
   the chordwise thickness downstream of the base being no greater than the chordwise thickness at the base; and
   said step including a planar surface that lies at an acute angle to an adjacent surface of the airfoil.

2. An ice prevention apparatus for an airfoil comprising:
   a step on the airfoil running in a spanwise direction;
   said step causing the chordwise thickness of the airfoil to decrease at a higher chordwise rate than the chordwise rate of change of thickness for the airfoil in the areas adjacent said step; and
   said step being comprised of a plurality of intersecting planar surfaces, with said planar surfaces lying perpendicular to an adjacent surface of said airfoil.

3. The ice prevention apparatus recited in claim 2 wherein at least two of said planar surfaces intersect each other at an angle that is not perpendicular.

4. An ice prevention apparatus comprising:
   an airfoil;
   a step in the airfoil that runs in a spanwise direction;
   said step having a base where said step meets a surface of the airfoil lying downstream of said step;
   the chordwise thickness of the airfoil downstream of the base being no greater than the chordwise thickness of the airfoil at the base; and
   said step including a planar surface that lies at an acute angle to an adjacent surface of the airfoil.

5. An ice prevention apparatus comprising:
   an airfoil;
   a step on the airfoil that runs in a spanwise direction; and
   said step being comprised of a plurality of intersecting planar surfaces, with said planar surfaces lying perpendicular to an adjacent surface of the airfoil.

6. The ice prevention apparatus recited in claim 5 wherein at least two of said planar surfaces intersect each other at an angle that is not perpendicular.

7. An ice prevention apparatus for an airfoil comprising;
   a step in the airfoil that runs in a spanwise direction;
   the airfoil having a chordwise thickness immediately upstream of the step;
   the airfoil having a chordwise thickness downstream of the step that remains less than the immediate upstream chordwise thickness; and
   said step including a planar surface that lies at an acute angle to an adjacent surface of the airfoil.

8. An ice prevention apparatus for an airfoil comprising:
   an airfoil having a chord line for every vertical chordwise cross section thereof;
   a step in the airfoil that runs in a spanwise direction, including surfaces surfaces 71, 73 and 75,
   an adjacent surface on said airfoil lying adjacent to and downstream of said planar surface;
   said planar surface lying at an acute angle to said adjacent surface; and
   in each vertical chordwise cross section of said airfoil, said planar surface reaching a maximum height relative to the chord line for that cross section, and each point on said adjacent surface lying at a distance from the chord line for that cross section which is less than said maximum height of said planar surface.

* * * * *